R. R. MILLER.
RAILROAD SWITCH OPERATING DEVICE.
APPLICATION FILED MAR. 27, 1908.
932,160.
Patented Aug. 24, 1909.
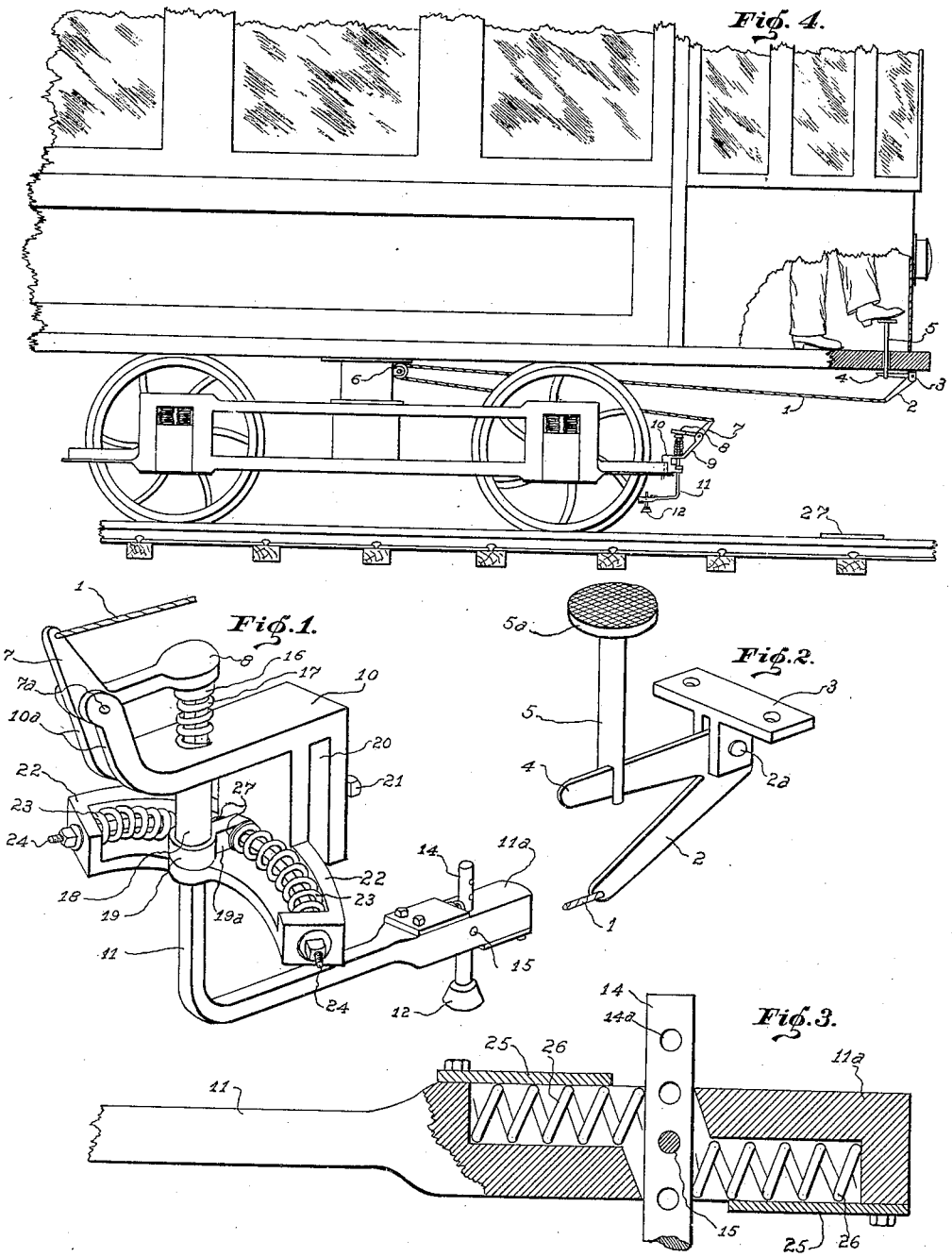
Witnesses.
D. A. Galloway
Geo. L. Walker
Inventor.
Royal Rueben Miller
By Lyman I. Henry
Attorney.

UNITED STATES PATENT OFFICE.

ROYAL RUEBEN MILLER, OF PUEBLO, COLORADO.

RAILROAD-SWITCH-OPERATING DEVICE.

932,160.  
Specification of Letters Patent.  
Patented Aug. 24, 1909.

Application filed March 27, 1908. Serial No. 423,676.

*To all whom it may concern:*

Be it known that I, ROYAL RUEBEN MILLER, a citizen of the United States, residing at Pueblo, in the county of Pueblo and State of Colorado, have invented a new and useful Improvement in Railroad-Switch-Operating Devices, of which the following is a specification.

My invention relates to railroad switch operating devices in which the mechanism that is carried by the car has cable means for accommodating the movement of the car bed and trucks in turning curves, and has spring means of centering a switching arm, and a spring means for allowing the switching pin to pass over an immovable object.

The objects of my invention are, first, to provide a springing action to all the necessary movements of an automatic switch operating device; and second, to provide a means for accommodating the movements of the car bed and truck in turning curves. I attain these objects by the mechanisms illustrated in the accompanying drawings in which,—

Figure 1 is a perspective view of that portion of my invention that attaches to the car truck. Fig. 2 is a perspective view of that portion of my invention that attaches to the car floor; Fig. 3 is a side elevation of a portion of the switching arm and pin in partial cross-section; and Fig. 4 is a side elevation of a portion of the front end of a street car in partial broken section with the car attachment of my invention mounted in place.

Similar numerals refer to similar parts throughout the several views.

In this application I employ certain devices, and do not claim broadly novelty in operating switch levers as in my former invention patented June 16, 1908, No. 890,784, where air means was provided to actuate the switch throwing device and certain spring means were therein provided; and also in my former patent, March 24, 1908, No. 882,707, spring means for returning the switch operating mechanisms was provided but not in the combination and without the arrangements herein provided.

Attached to the car in the motorman's stand is a bell-crank lever having arms 2 and 4 on the pivot $2^a$ held by pivot piece 3 underneath the floor of the car. Extending through the floor of the car is the rod 5 provided with the foot piece $5^a$ attached to arm 4 of the bell-crank lever. At the end of the arm 2 is attached the cable 1 which extends backward underneath the floor of the car to the pulley 6 at a place as near as possible to the kingbolt connecting the truck bearing and the car body. The other end of the cable 1 is attached to a lever 7. A spring containing frame 10 is provided with upward extending elements $10^a$ in which is pivot bearing $7^a$ for lever 7. The spring containing frame 10 is extended and provided with attaching slot 20 and set screw 21 for attachment to truck frames, or a bar in front of the trucks. The elements 22 having the form of an arc of a circle are made a part of the frame 10. The lever 7 has an extended arm 8 and is joined to the upper part of the cap 16. The bent square switching arm 11 has attached at its top the cap 16 and the arm passes through the circular opening in the top of the frame 10. A spiral spring 17 is provided that raises the lever end 8, attached to the switching arm 11, to the required position. The switching arm passes through a circular hole in the central part of elements 22 and attached thereto is the centering arm $19^a$ which is provided with a square hole fitting and slidable on lever 11 at 19 with extended arm $19^a$ in which at the end thereof is provided a hole through which is loosely operative the rod 24, which rod 24 is provided with threads and nuts at each end attaching it firmly to said elements 22. On each side of centering arm $19^a$ and operative against its respective side of said arm and the end of said circular element 22 is placed a spiral spring 23 around said rod 24. Between the attachment of the centering arm $19^a$ at 19 on lever 11 and the underside of the top of frame 10 a distance washer is placed.

The horizontal arm $11^a$ of the switching lever is provided with a hole for the pin 15 by means of which the switching pin 14 is attached having the foot 12. The hole through which said switching pin operates is so constructed that the bottom of the pin may have a backward movement. On the top of arm $11^a$ and in front of the switching pin a space is provided in which is placed a spiral spring 26 which is held in place by retaining piece 25. On the lower side of arm $11^a$ and immediately back of said switching pin a space is provided in which is placed a spiral spring 26 which is held in place by the attached plate 25.

By pressure upon the foot piece $5^a$ the cable 1 pulls lever 7 forward forcing the switching arm 11 downward and causes the foot piece 12 of the switching pin to engage the ground switching construction. I am aware that cables have been used and bell-crank levers in such construction, but in my device the arrangement of the cable is such that it is attached near the kingbolt and then passes forward to the operating device giving an immediate adjustment to the curves in the track without the intervention of other mechanisms, so that whatever the relative position of the body of the car and the trucks, by this arrangement that I have provided, immediate adjustment is made and the switch operating device operated while the switch operating device is carried, at all times relative to the track and wheels in a fixed position. By means of the spiral spring 17 the switching lever 11 is returned to its normal position when pressure on the foot piece 5ª is removed. The arrangement of the spiral springs on the centering arm gives the advantage of the required strength and a yielding to lateral pressure of the end 11ª of switching lever so that in case the ground device becomes blocked or fixed the arm will yield before a breaking strain has been reached and the arm would return to its normal position. By the provision I have made for spring means as applied to the switching pin the required amount of strength may be obtained and release to the pin in case the pressure becomes great so that breaking of the mechanism would be avoided and thus the pin would pass over an obstruction and not destroy the whole switching device.

I claim:

1. In an automatic switch operating device of the character described, a pulley guided cable with the pulley attached near the kingbolt connecting a foot operated lever carried by the car floor to a lever attached operatively to engage a switching lever carried by the car truck, all substantially as described.

2. In an automatic switch operating device of the character described, a centering arm slidably engaging a switching lever, centering springs engaging each side of said centering arm, a spring containing frame carrying said centering arm, centering spring and switching lever attached to the truck of the car, all substantially as described.

3. In an automatic switch operating device of the character described, a switching pin pivoted in a switching lever with spring cushioned means permitting movement of the bottom of said pin backward, all substantially as described.

In witness whereof I have signed my name to this specification in the presence of two subscribing witnesses.

ROYAL RUEBEN MILLER.

Witnesses:
   GEO. L. WALKER,
   C. M. WALKER.